Figure 1:
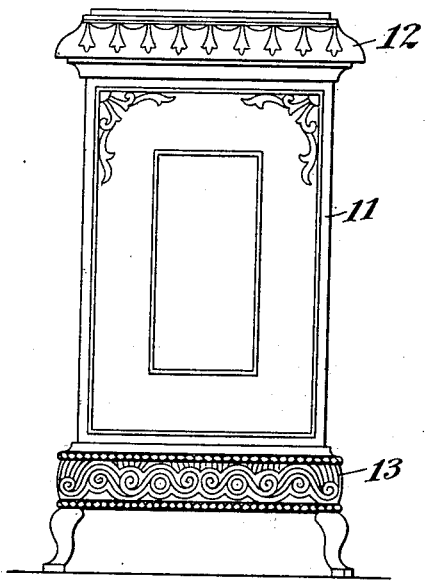

No. 740,125. PATENTED SEPT. 29, 1903.
J. H. HALLBERG.
ELECTRIC HEATER.
APPLICATION FILED NOV. 8, 1902.
NO MODEL.

Witnesses:
Chas. D. King

Inventor:
Josef Henrik Hallberg,
By his Attorney
Lewis J. Doolittle.

No. 740,125. Patented September 29, 1903.

UNITED STATES PATENT OFFICE.

JOSEF HENRIK HALLBERG, OF NEW YORK, N. Y.

ELECTRIC HEATER.

SPECIFICATION forming part of Letters Patent No. 740,125, dated September 29, 1903.

Application filed November 8, 1902. Serial No. 130,566. (No model.)

*To all whom it may concern:*

Be it known that I, JOSEF HENRIK HALLBERG, a citizen of the United States, and a resident of New York, in the county of New York and State of New York, have invented certain new and useful Improvements in Electric Heaters, of which the following is a specification.

This invention relates to improvements in electric heaters, the main object of the invention being to convert electric energy into heat energy in a more economical manner than it has heretofore been done.

Electrical apparatus as generally designed for the purpose of converting electric energy into heat usually belong to that class in which the electric energy in passing through a medium develops heat as a result of the resistance of such medium to the passage of the electric current therethrough. The electric heater which I have devised is an improved apparatus of the type in which the heat developed therein is derived from the field of force surrounding an electrical conductor and is developed in a medium which is placed in said field of force, but does not form part of the circuit of the electrical conductor. The conversion of electric energy into heat according to my system is therefore dependent upon the setting up of a field of force around an electrical conductor and upon the development of heat directly from the lines of force of this field or from electric currents—that is, eddy currents—induced by the lines of force of said field. In order to develop heat from these lines of force composing the field surrounding an electrical conductor, it is essential that the flow of these lines of force shall be of varying intensity, and this is usually accomplished by varying the intensity of the flow of lines of force—that is, the intensity of the electric current flowing in the electrical conductor about which such field of force is established. This variation of the intensity of the flow of the lines of force composing such field can be best obtained by passing an alternating electric current through a conductor around which it is desired to establish such a varying flow of lines of force, because the complete reversal of the flow of these lines at each alternation will produce the heating effect in a heat-developing medium placed in such field so as to be traversed by said lines of force. If this medium is a magnetic metal, the magnetic lines of force which pass through the metal being completely reversed at each alternation of the electric current will reverse the magnetization of each molecule of the metal at each alternation of the electric current—that is to say, the magnetic lines of force will tend to turn the molecules of the metal first in one direction and then in another in accordance with the direction of flow of such lines of force, heat being produced in such metal by the molecular friction resulting from the rapid changes in the positions of the molecules. In electrical machinery the losses due to such heating effects are reduced to a minimum by the use of laminated cores, &c., and by employing a good quality of soft iron. In order to obtain the greatest heating effect, the metal to be heated should be in a solid mass and should be relatively hard, hard cast iron and steel producing good results. For this reason in any type of heating device in which my invention may be embodied in order to obtain the best results the apparatus should be made of such material and the construction should be such as to permit as many of the magnetic lines of force to be impressed as possible and should also be such as to retard as much as possible the reversal of the magnetization. These and other features of my invention not hereinbefore referred to, but which will be hereinafter described, are illustrated in the accompanying drawings, in which—

Figure 2:
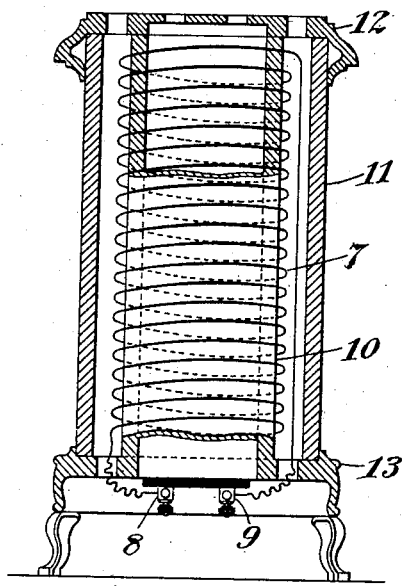
Figure 3:
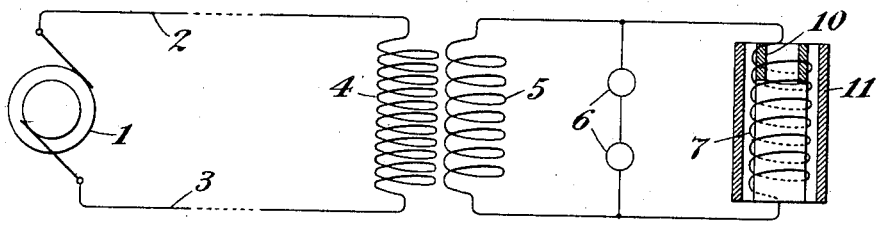

Figure 1 is a front elevation of a simple form of electric heater adapted for use on an ordinary house-circuit of an alternating-current system and illustrates one embodiment of my invention. Fig. 2 is a vertical section of the same. Fig. 3 is a diagrammatic view of an ordinary alternating lighting-circuit including a heater embodying my invention.

A field of force of varying intensity suitable for the development of heat in accordance with my invention may be established in many ways, but preferably by means of an alternating electric current. Such a current will usually be derived from an alternating source of energy, such as 1, from which the current may be led by ordinary street-mains, such as 2 and 3, to a suitable translating device, such as a transformer, the primary winding of which is indicated at 4 and the secondary at 5. This transformer will effect the usual conversion of a high-tension current into one of lower potential for house-lighting purposes, the nature of the secondary circuit employed by me being indicated by the presence therein of incandescent lamps 6, which, however, constitute no part of my invention.

One of the main elements of an electric heater adapted to develop heat energy from the energy of a field of force is an electrical conductor or coil, such as 7, through which an electric current flows and around which a field of force is established by such flow. The number of turns of the coil 7 will be proportioned properly for the work to be done and also to the available energy of the source of supply. The coil 7 may be connected in circuit with the secondary 5 through suitable binding-posts, such as 8 and 9, on another element of the heater.

As before stated, I prefer to employ a heater in which the heat-developing medium or metal is not merely located in the field of force, but forms part of a complete metallic circuit. One of the elements of such circuit is the core around which the coil or helix 7 is wound, and this core is a magnetic metal. The particular construction of this core may be varied at will, according to the character of the electrical apparatus in which it is desired to develop heat. In the construction shown in the drawings, which illustrates a house-heater similar to a radiator of a steam-heating system, a tubular magnetic core, such as 10, is preferred in order to admit of the exposure of the largest area of heated metal to upwardly-flowing currents of air. The remainder of the metallic magnetic circuit of this type of electric heater may be formed by connecting with the tubular core 10 a tubular metallic magnetic shell of sufficient size to surround the coil 7 and completely inclose said coil and its core. These two tubular magnetic shells 10 and 11 will usually be of similar cross-section, they being oblong in cross-section in the construction illustrated. Any suitable means may be employed for holding the core, coil, and the outer heat-developing shell 11 in their proper relative positions. When the parts are organized as illustrated in Fig. 2, it will be seen that both sides of each of said shells are exposed to a current of air traveling upward through the heater and that three different upwardly-flowing currents of air are simultaneously heated by the metallic surfaces to which they are exposed.

The particular construction of core shown herein is intended for use with the particular type of electric heater illustrated and, as shown, constitutes a heat-developing solid mass of metal similar in its functions to the outer shell or metallic body 11. In general, however, the medium or body outside the coil in an electric heater embodying my invention is the principal medium in which the energy of the field of force is converted into heat energy. When so placed, such outer solid body or mass of magnetic metal forms part of a magnetic circuit, which in the preferred construction is a metallic circuit completed in any suitable manner, in this case through metallic end pieces, such as a cover 12 and a base 13, which form a metallic connection between the shells 10 and 11. The cover 12 and base 13 have openings therein, through which heated air may pass and cold air be drawn to take its place.

What I claim is—

In an electric heater, the combination with a base, of an electric coil, and a metallic circuit embodying a tubular metallic core through which a body of fluid may flow and a tubular metallic shell surrounding said core and coil in the field of force of the coil for converting energy of said field into heat energy said core and shell forming between them and around said coil an open channel in which another body of fluid may flow in contact with the core the coil and the shell and being mounted on said base and rising vertically therefrom to heat such fluid continuously and cause it to ascend.

Signed at New York, in the county of New York and State of New York, this 5th day of November, A. D. 1902.

JOSEF HENRIK HALLBERG.

Witnesses:
I. WERTHEIMER,
H. P. WELLMAN.